United States Patent [19]
Eastwood

[11] Patent Number: 5,733,189
[45] Date of Patent: Mar. 31, 1998

[54] SPHERICAL AIR VENT FOR A MOTOR VEHICLE

[75] Inventor: James Eastwood, Much Hadham, England

[73] Assignee: Ford Global Technologies, Inc., Dearborn, Mich.

[21] Appl. No.: 682,241

[22] Filed: Jul. 12, 1996

[51] Int. Cl.⁶ .................................................. B60H 1/34
[52] U.S. Cl. ........................ 454/155; 454/286; 454/318
[58] Field of Search ............................ 454/155, 286, 454/313, 318

[56] References Cited

U.S. PATENT DOCUMENTS

| | | |
|---|---|---|
| 3,103,155 | 9/1963 | Boylan et al. . |
| 3,276,347 | 10/1966 | Atkinson et al. . |
| 3,814,001 | 6/1974 | Hill . |
| 4,345,510 | 8/1982 | Sterett .................. 454/155 X |
| 4,524,679 | 6/1985 | Lyons . |
| 4,699,322 | 10/1987 | Jobst ..................... 454/155 X |
| 5,127,876 | 7/1992 | Howe et al. ............... 454/76 |
| 5,399,119 | 3/1995 | Birk et al. ................ 454/76 |
| 5,575,715 | 11/1996 | Norbury, Jr. et al. ........ 454/286 |

FOREIGN PATENT DOCUMENTS

| | | |
|---|---|---|
| 0 622 257 | 11/1994 | European Pat. Off. . |
| 2230944 | 12/1974 | France ..................... 454/155 |
| 25 19 846 | 11/1976 | Germany . |
| 27 54 869 | 6/1978 | Germany . |
| 60-101442 | 6/1985 | Japan ...................... 454/313 |
| 0695066 | 8/1953 | United Kingdom . |
| 826791 | 1/1960 | United Kingdom ............ 454/286 |
| 1277184 | 6/1970 | United Kingdom . |
| 1 317 251 | 5/1973 | United Kingdom . |
| 1 365 681 | 8/1974 | United Kingdom . |
| 1 396 993 | 6/1975 | United Kingdom . |
| 1 402 755 | 8/1975 | United Kingdom . |
| 1 436 838 | 5/1976 | United Kingdom . |

*Primary Examiner*—Harold Joyce
*Attorney, Agent, or Firm*—Raymond L. Coppiellie

[57] ABSTRACT

An air vent for use in a motor vehicle passenger compartment, and in particular to an air vent with an air grill that can be rotated to a closed position. A housing has a first pivot bearing to which is connected a carrier with a second pivot bearing. An air grill with vanes has generally spherical peripheral surfaces and is connected to the second pivot bearing. The air grill may then be rotated about two orthogonal axes within the housing to vary the direction of the air flow entering the passenger compartment. The central vane has a circular periphery, and the air grill may also be rotated to a position in which this vane makes a seal with a compliant sealing section within the housing to close off the flow of air through the air vent.

12 Claims, 6 Drawing Sheets

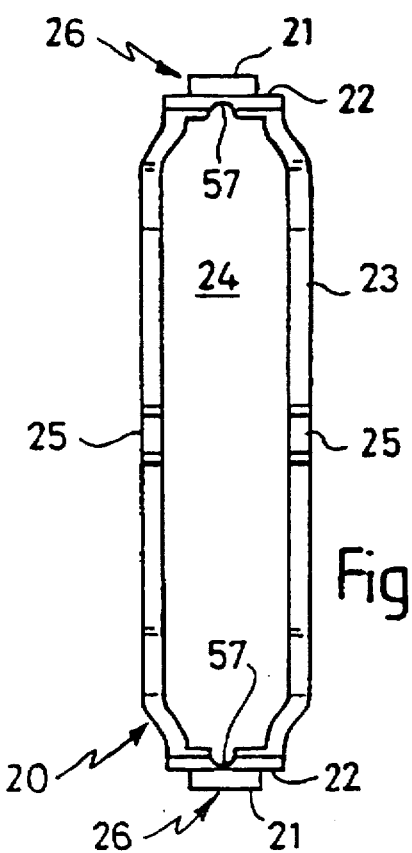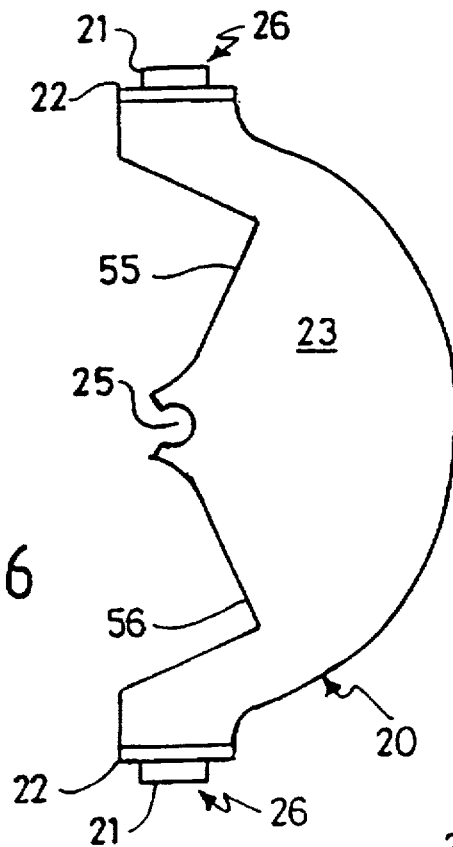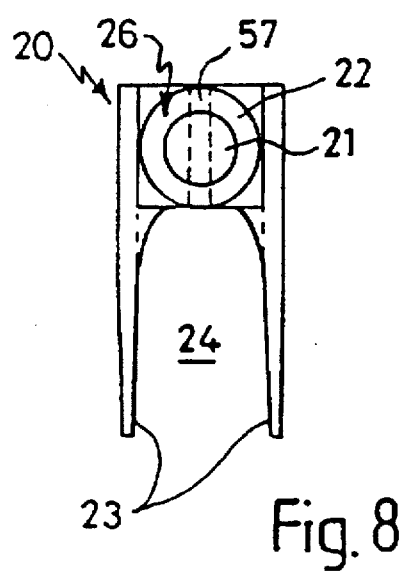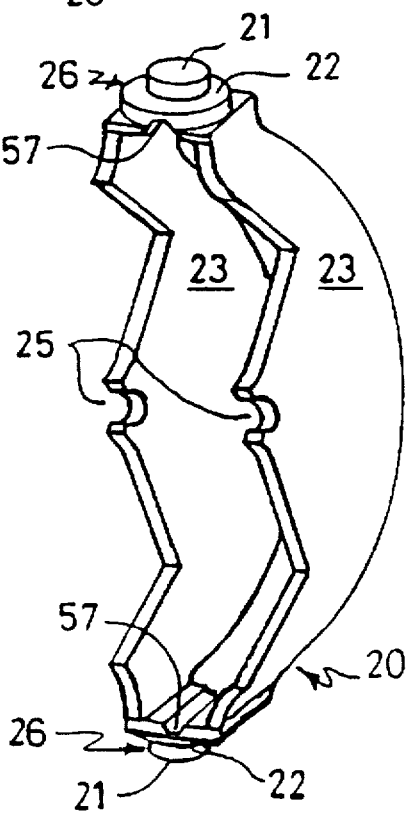

SPHERICAL AIR VENT FOR A MOTOR VEHICLE

BACKGROUND OF THE INVENTION

1. Field of the Invention

The present invention relates to an air vent for a motor vehicle passenger compartment.

2. Disclosure Information

An air vent in an automotive vehicle may have an air grill with vanes or louvers, and be substantially spherical in shape and held in a surrounding annular housing. Such an air vent may be rotated to vary the direction of the air supplied through the vanes to the passenger compartment over substantially a half-sphere. In one arrangement, disclosed in EP 0 622 257, an air grill is held within a tubular housing between two orthogonal pairs of pivots. The air grill has a circular periphery in a plane perpendicular to the axis of the housing, but does not have a circular periphery in a plane parallel to this axis. This air grill is therefore not a spherical air grill. Additionally, this air grill may not be rotated within the housing to a restrict or close off the air flow. The present invention overcomes these limitations in the prior art.

SUMMARY OF THE INVENTION

According to the present invention, an air vent is provided for controlling air flow to the passenger compartment of a motor vehicle. The air vent comprises a housing with a first pivot bearing therein, a carrier with a second pivot bearing thereon, and an air grill with vanes to control the air flow through the air vent. Within the air vent, the carrier is connected inside the housing to the first pivot bearing for rotation about a first axis. The air grill has a generally spherical envelope inside the air vent and it is connected to the second pivot bearing for rotation about a second axis. The term envelope is used to mean a continuous surface which extends between and incorporates the peripheral points of the air grill. The air grill may then be rotated to control the direction of the air flow through the air vent and also to close the air vent completely.

It is advantageous if at least one vane has a substantially circular periphery. If it is a central vane which is circular, then this periphery may have a radius equal to the radius of the generally spherical envelope. One or more vanes may also have a planar surface profile and have surfaces which are parallel with surfaces on other vanes.

In order to provide the maximum adjustment range for the direction of the air supplied to the passenger compartment, the air grill may rotate through at least 180° about at least one axis, centered about a mid-plane through the housing. The direction of the air supplied to the passenger compartment may then be varied over a range of up to a half-sphere. At the extremes of adjustment of 0° and 180° along one of the axes, which is preferably an axis parallel to the sealing vane, the sealing vane may make the seal with the housing. In order to provide a useful adjustment range about the other axis, which is preferably an axis perpendicular to the sealing vane, the air grill should rotate over an adjustment range of at least 60° centered about a mid-plane through the housing.

These and other objects, features and advantages of the present invention will become known from the drawings, detailed description and claims which follow.

BRIEF DESCRIPTION OF THE DRAWINGS

FIG. 6 is a front view of the first embodiment of the carrier.

FIG. 7 is a side view of the first embodiment of the carrier.

FIG. 8 is a top view of the first embodiment of the carrier.

FIG. 9 is an isometric view of the first embodiment of the carrier.

DETAILED DESCRIPTION OF THE INVENTION

Figure 1:
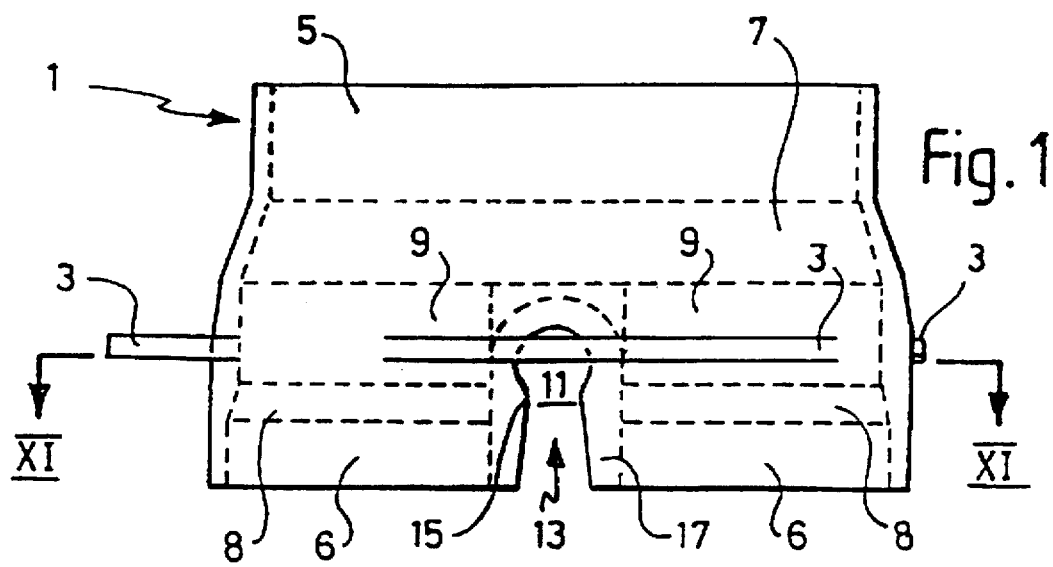
FIG. 1 is a top view of a first embodiment of an air vent housing looking down on a housing pivot bearing.
Figure 4:
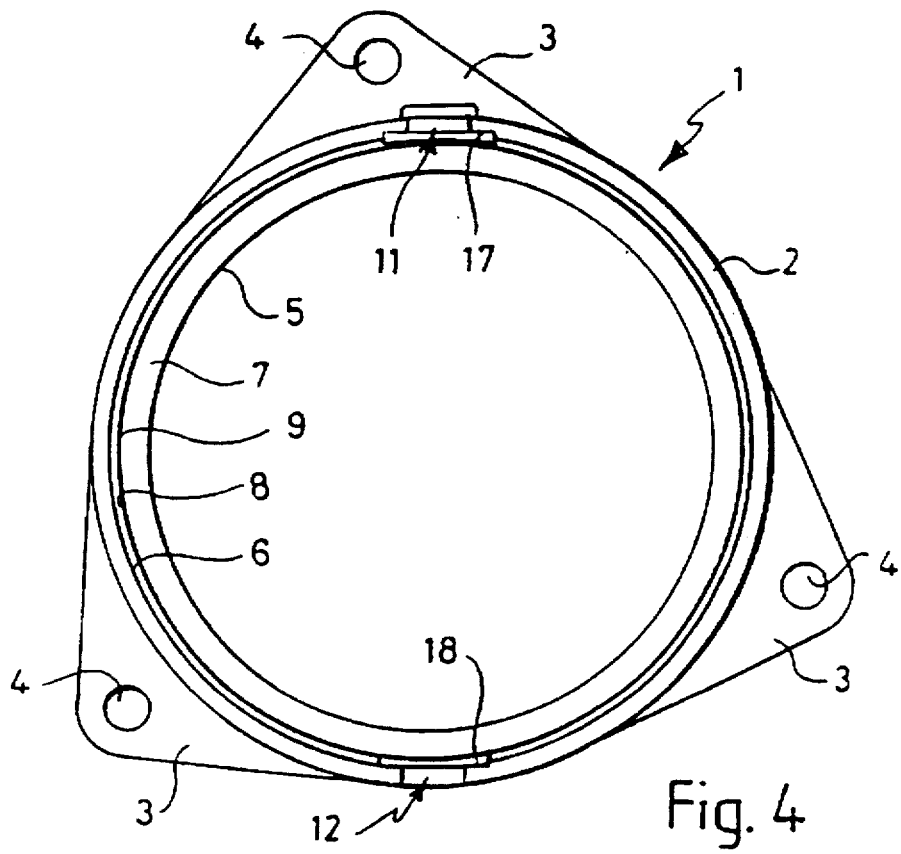
FIG. 4 is a front view of the first embodiment of the housing.
Figure 5:
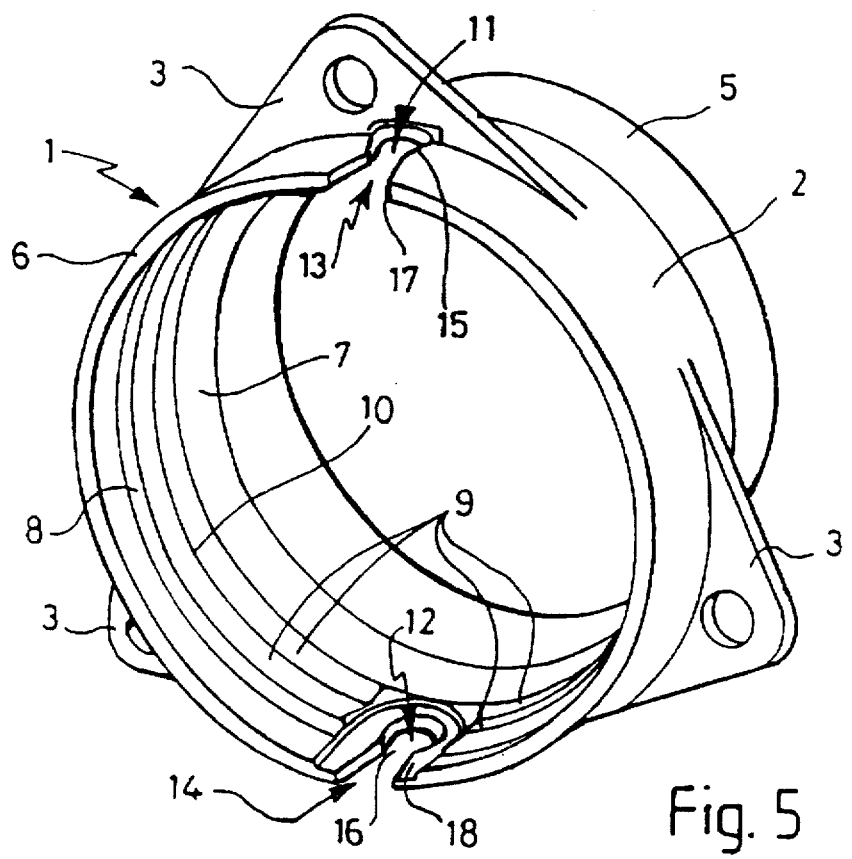
FIG. 5 is an isometric view of the first embodiment of the housing.

Referring first to FIGS. 1, 4 and 5, an air vent housing 1 has tubular body 2 with a generally circular cross section. Extending perpendicularly outwards from the body are three coplanar mounting flanges 3 that have apertures 4 through which mounting screws (not shown) may secure the air vent housing within a component such as a motor vehicle instrument panel. One end of the housing body is necked down to an inner section 5 with a reduced diameter to which a matching tubular air duct (not shown) may be connected for the supply of air. The other end opens up to an outer section 6 with a slightly greater inner diameter. Between these two parallel-walled sections 5 and 6 are two taper sections 7 and 8 leading to a central sealing section 9 that has an inner diameter intermediate that of the inner and outer sections 5 and 6.

The sealing section 9 is formed from a synthetic rubber material which is a thermo-plastic polyurethane elastomer sold under the trade name Desmopan™. The housing 1 is formed in a two-stage injection mold process, with the main body and flanges first molded in a plastic material. The body of the housing is formed with a channel into which the Desmopan™ polyurethane elastomer is injected in the second stage of the process. The sealing section 9 is divided into two half rings by housing bearing points 11 and 12, and also has running along its center line a V-shaped recess 10.

Referring to FIGS. 2, 6, 7, 8 and 9, the carrier 20 has a pivot 26 at each end formed from a cylindrical button 21 surrounded concentrically by a flat cylindrical shoulder 22.

Figure 2:
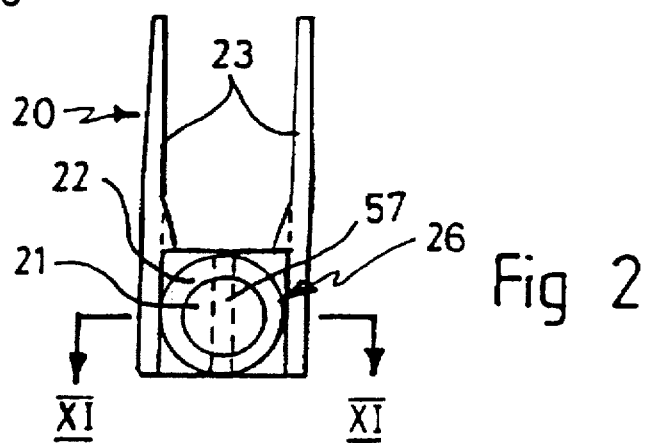
FIG. 2 is a top view of a first embodiment of a carrier, prior to insertion of the carrier into the housing of FIG. 1.

As can be seen from the relationship between FIGS. 1 and 2, the carrier 20 is connected to the housing first by inserting the carrier into the housing so that each button 21 enters a channel 13,14. The channels both taper down to necks 15,16 beyond which are the housing bearing points 11,12. Each shoulder 22 will seat against a matching flat surface 17,18 either side of a channel 13,14. The buttons 21 have a diameter which is too wide to pass through the necks 15,16.

There is, however, enough flexibility in the housing 1 to permit the housing to deform sufficiently to allow the buttons 21 to slide along the flat surfaces 17,18 and seat into the apertures at the housing bearing points 11,12, whereupon the carrier 20 is held in a secure pivotal arrangement within the housing 1.

Once the carrier 20 is connected to the housing 1, the carrier may be rotated freely through 360° about a pivot axis defined by the housing bearings 11,12. The structure of the carrier 20 is symmetric about a plane through an axis defined between the carrier pivots 26 and also through a plane at right angles to this axis midway between the pivots. The carrier divides into two straight parallel flat arms 23 which extend out from opposite sides of both pivots 26 and which therefore join the carrier pivots 26 together. There is a gap 24 between these arms approximately equal to the diameter of the shoulders 22. At a mid-point of each arm is a carrier bearing point 25. An axis defined by these bearings would intersect the carrier pivot axis at right angles and midway between the carrier pivots 26.

Figure 3:
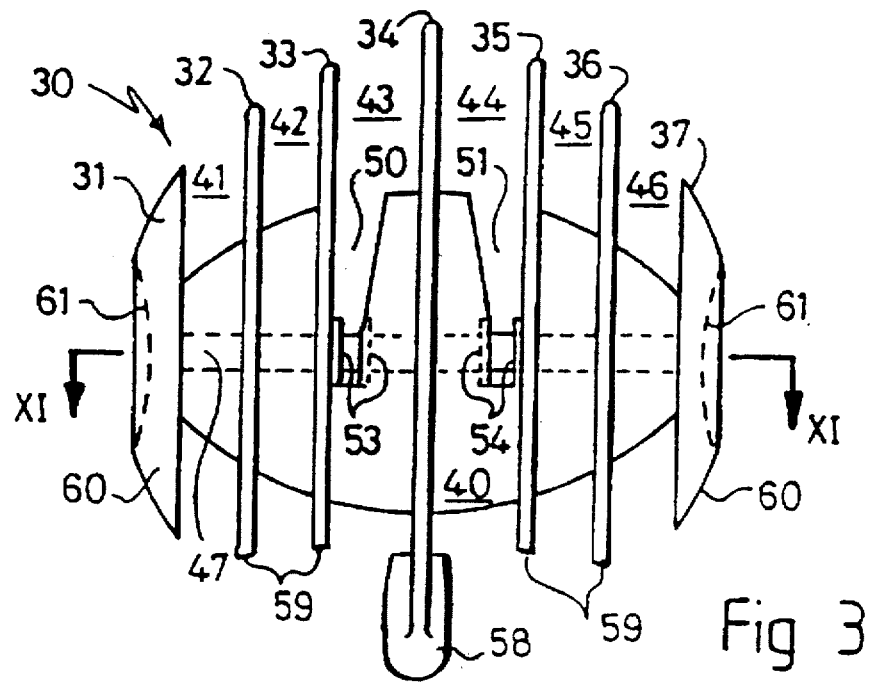
FIG. 3 is a top view of an air grill, prior to connection of the air grill to the carrier of FIG. 2.
Figure 10:
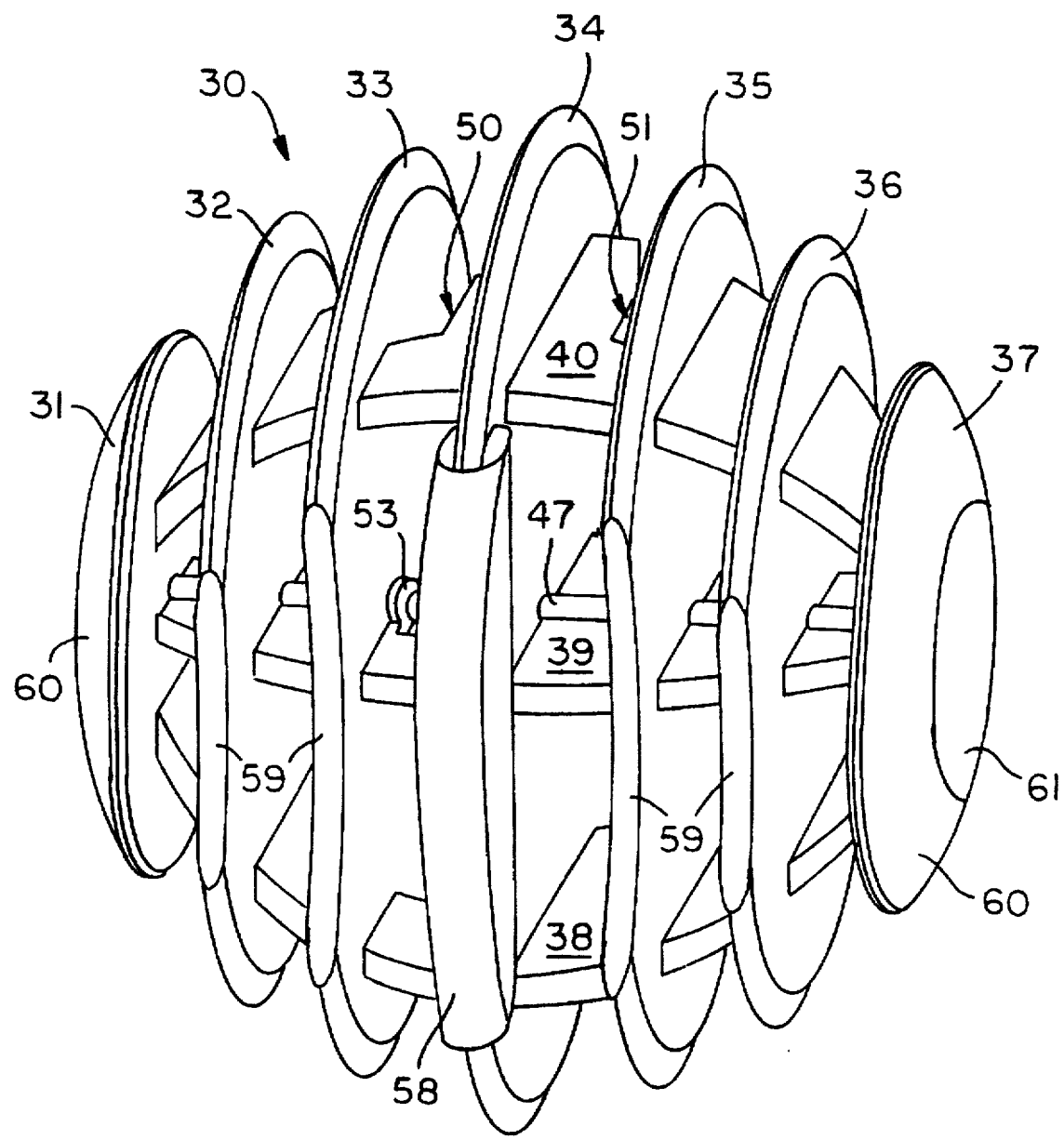
FIG. 10 is an isometric view of the air grill.

An air grill 30 is illustrated in FIGS. 3 and 10. This has seven vanes 31–37 that define six parallel channels 41–46 through the air grill. There are also three transverse vanes 38,39,40 linking the seven parallel vanes 31–37. The central transverse vane 39 lies on a central pivot axis 47 through the air grill, with each of the two other transverse vanes 38,40 bowed in arcs between the endmost parallel vanes 31,37. All three transverse vanes are partially cut through by two channels 50,51, on either side of the central parallel vane 34. As seen in FIG. 3, the channels 50,51 extend far enough through the transverse vanes 38,39,40 to expose to view the central pivot axis 47. These two channels 50,51 have a spacing so that the two arms 23 of the carrier 20 may slot into the air grill 30 to allow the air grill to be connected to the carrier. This is done by first by inserting the arms 23 into the channels 50,51 so that the carrier bearing points 25 enter between two pairs of flanges 53,54 on the central pivot axis 47. Each carrier bearing 25 has an entrance neck through which the pivot axis 47 may snap past into engagement with the bearing, whereupon the grill 30 is held in a secure pivotal arrangement with the carrier 20.

If the three transverse vanes were cut all the way through by the channels 50,51, so that the air grill was only held together by its central pivot axis 47, then the air grill would be able to rotate through a full 360°. However, this full degree of freedom is not necessary for most purposes, and the air grill as illustrated in the drawings may rotate ±30° about the central pivot axis. The degree of rotation is limited by the contact between the innermost end of the channels 50,51 in the bowed transverse vanes 38,40, and end-stop surfaces of the carrier indicated by the numerals 55 and 56, as seen in FIG. 7. The degree of rotation of the air grill about this axis may therefore be designed to be less or more than ±30° depending on the profile of the carrier end-stop surfaces 55,56 and the depth of the channels 50,51 through the bowed vanes 38,40.

Figure 11:
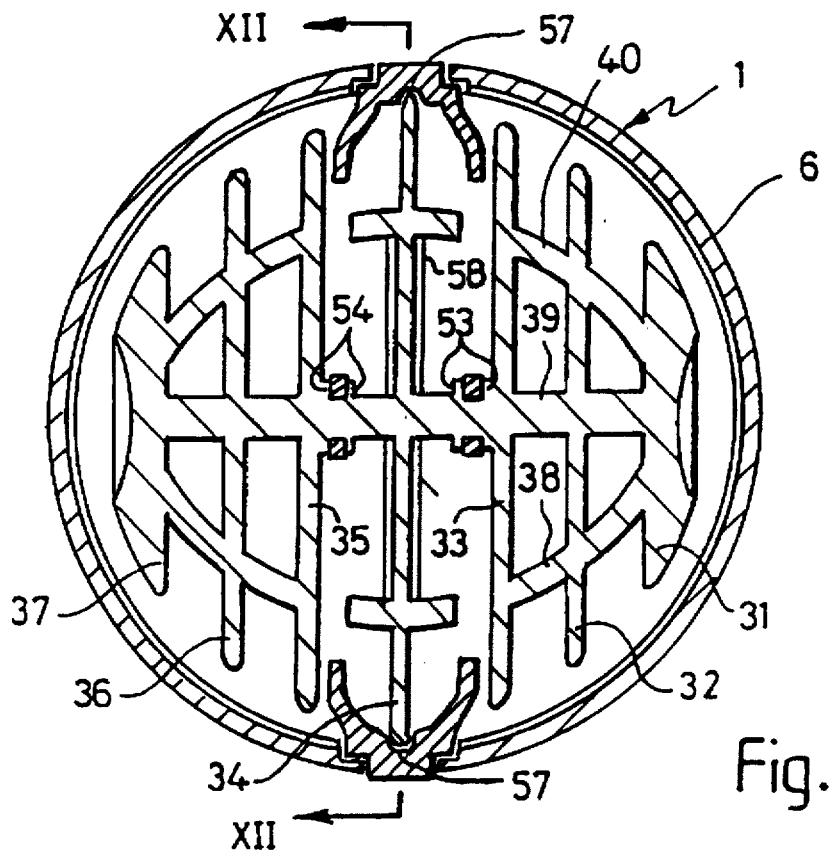
FIG. 11 is a cross section view of the air vent, showing the housing, carrier, and air grill of FIGS. 1, 2 and 3, each taken along line XI—XI.
Figure 12:
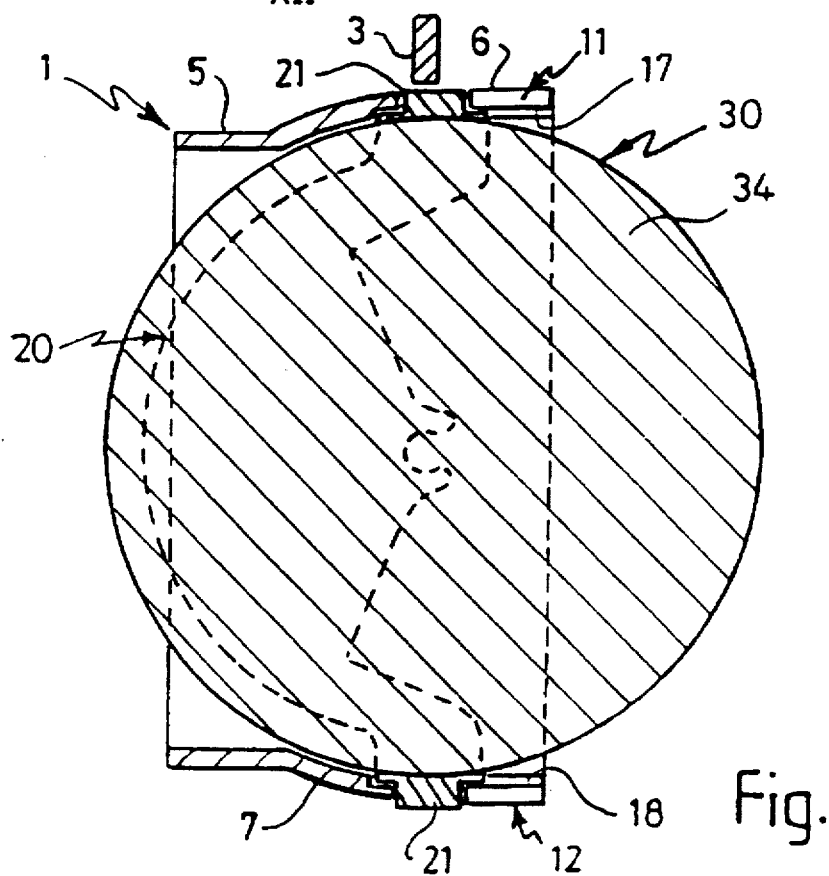
FIG. 12 is a cross section view of the air vent of FIG. 11, taken along line XII—XII.

Once the air grill is assembled with the carrier, the central parallel vane 34 lies in the center of the gap 24 between the arms 23. In order to help maintain this alignment between these two components, and, in particular, to reduce stresses imparted by the central pivot axis 47 on the carrier bearings 25, two opposite edges of the central parallel vane 34 rest in a close slidable fit within two grooves 57 in the inner-facing surface of the shoulders 22. This can be seen most clearly from FIGS. 11 and 12.

The air vent may be disassembled in two stages. First, the air grill will snap out of the carrier bearings 25 if it is pulled with sufficient force. Then, the body 2 of the housing may be deformed slightly by squeezing the housing at right angles to the axis of the carrier, so that the diameter of the housing along the carrier axis is increased sufficiently to permit the carrier to be disengaged from the housing. After the assembled air vent is incorporated in an instrument panel, the air grill may still be removed from the housing. This may, for example, be necessary in order to clean inside the housing. However, the carrier will remain in place, since the body of the housing will be held securely by screws through the three apertures 4.

As may be seen from FIG. 3 and 10, the air grill has a grip 58 incorporated along one edge of the central parallel vane 34. The two pairs of vanes 32,33,35,36 either side of the central vane have a circular bight 59 in otherwise circular profiles, so that fingers may more readily manipulate the grip 58. For the same reason, the end vanes 31,37 both have around the central part of their external spherical surface 60, a depression or spherical bight 61. These bights may, optionally, be provided with a textured finish to improve the grip. Since the carrier 20 may rotate 360° about its axis, the air grill 30 may be oriented with the grip 58 facing either inwards or outwards. Although the air grill may not be quite as easy to manipulate with the grip facing inwards, some users may find the air grill more aesthetically pleasing with the circular sides of all the parallel vanes 31–37 projecting sphere-like from the housing.

The direction of the air flow entering the passenger compartment may be adjusted in the following manner. The air grill 30 may initially have the grip 58 facing outwards and may be set to a median adjustment, so that the air flow directed by the vanes 31–37,38–40 is expelled along the axis of the housing body 2. It is generally preferred if the carrier axis is aligned vertically, in order to obtain the maximum left-right adjustment. The direction may then be adjusted by rotating the air grill about the horizontal and vertical axes. The air flow through the vent may be blocked by rotating the air grill until the central vane 34 is at right angles to the axis of the housing. The external circular edge of the central parallel vane will then be in contact with the sealing section 9 and engaged with the central V-shaped recess 10, which acts as a locating feature to hold the central vane in place. In order to maximize the efficiency of the seal by reducing any gaps in the seal, the housing may have a compliant surface for making an air tight seal, with the sealing vane. The compliant surface may have an inner dimension which is just less than the outer dimension of the sealing vane. Then, when the vane is rotated to make contact with the compliant surface, the peripheral surface of the vane will be pressed into the compliant surface and so close any small gaps to make a good seal. The friction in such a compliant fit will also hold the air grill in the sealed orientation and so maintain the seal. The compliant surface may also be provided with a locating feature, such as a groove, into which the sealing vane may engage and locate into place.

Further, the compliant surface may be substantially in the shape of a ring arranged on an inner-facing surface of the housing, and may also be discontinuous in the vicinity of the first pivot bearing.

Figure 13:
FIG. 13 is an isometric view of the top portion of a second embodiment of a carrier.
Figure 14:
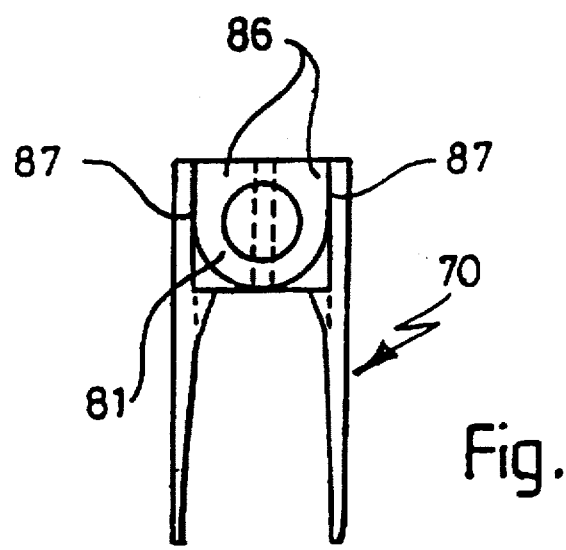
FIG. 14 is a top view of the carrier of FIG. 13.
Figure 15:
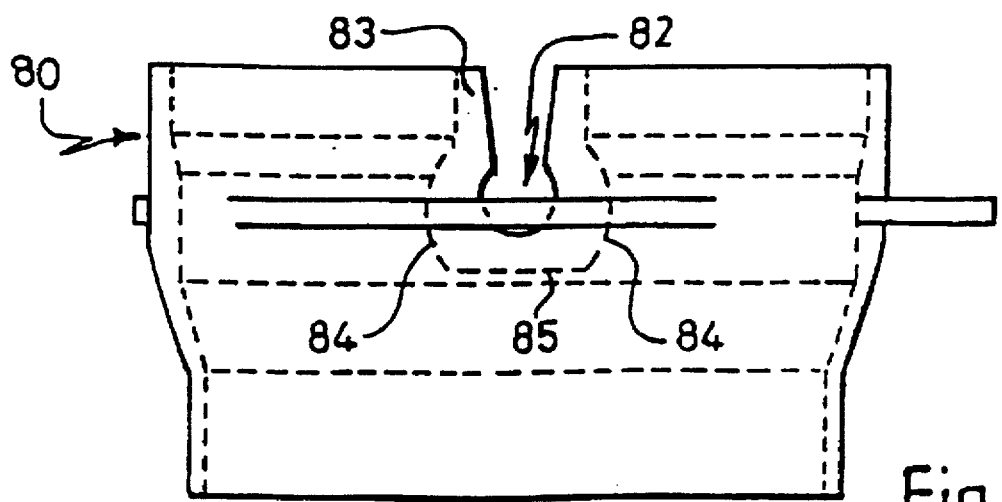
FIG. 15 is a top view of a second embodiment of the air vent housing.

FIGS. 13, 14, and 15 show a modification of the carrier 70 and the housing 80, which restrict the rotation of the carrier about its axis to 180°. The carrier shoulder 81 has one half with a circular outline, with the other half modified with a rectangular outline including shoulder corners 86 and two parallel straight shoulder sides 87. The housing bearing points, only one of which 82 may be seen, is also modified so that each flat surface 83 matches the modified shoulder 81. In particular, a part-circular edge 84 to the flat surface has an increased radius to match the increased distance of the shoulder corners 86 from the carrier axis. The maximum degree of rotation between the carrier and the housing is then limited to 180° by the contact between a straight edge 85 to the flat surface and one or the other of the shoulder sides 87.

Apart from these modifications, the assembly of the air vent is the same as described above. This limitation in the movement of the air grill ensures that the grip 58 on the central parallel vane 34 does not become oriented away from the passenger compartment. Nevertheless, the grip feature will still become inaccessible once the air grill is rotated to make a seal with the sealing section 9 restrict or shut off the air flow from the vent. However, when this is so, the air grill may still usefully be manipulated through one of the end vanes 31,37, which will have rotated into a prominent position towards the user.

An alternative to an integral housing, not illustrated in the drawings, is to mold the housing as two tubular portions which then snap together along a seam. For example, the inner housing section 5 can be formed separately in a one-step injection mold, and the outer and sealing sections 6,9 can be formed together in a two-stage injection mold. This can reduce the tooling and manufacturing costs. The sealing section 9 may, of course, be formed from other materials, and the polyurethane sold under the trade name Kraton™ has been found to give good sealing performance.

An air vent as described above has an air grill which may be readily manipulated, and which may be quickly rotated to a closed position to restrict the air flow from the air vent. Hence, there is, for example, no need for an additional air volume control means. An air vent constructed according to the invention will therefore have fewer moving parts than are normally associated with a conventional air vent. The exact structure and arrangement of the vanes according to the invention may, of course, be varied according to need or to taste. For example, the transverse vanes may be straight and parallel, rather than bowed as described above.

Equivalent sealing arrangements may also be used, for example, a sealing vane with a flexible peripheral tip, perhaps formed from a synthetic rubber, which makes a compliant seal with a rigid sealing surface within the housing. Similarly, the shape of the air grill envelope may deviate from being spherical while still retaining the same functionality as described above. In particular, as long as the envelope of the air grill may be rotated within the housing without interference from the internal surfaces of the housing, and as long as the sealing vane has an external profile which matches the sealing surface in the housing, then the air grill may be rotated to a closed position to restrict or stop the air flow.

Various modifications and variations will no doubt occur to those skilled in the various arts to which this invention pertains. Such variations which basically rely on the teachings through which this disclosure has advanced the art are properly considered within the scope of this invention.

What is claimed is:

1. An air vent for controlling air flow to the passenger compartment of a motor vehicle comprising:

a housing with a first pivot bearing therein, said housing having a compliant surface with a locating feature for making a seal;

a carrier with a second pivot bearing thereon connected within the housing to the first pivot bearing for rotation about a first axis; and an air grill with vanes to control the air flow through the air vent and having a generally spherical envelope, said air grill being connected to the second pivot bearing for rotation about a second axis, and wherein the air grill may be rotated to a position in which at least one vane acts as a sealing vane to make the seal with the housing around substantially the whole periphery of the vane, the compliant surface of the housing including a locating feature with which the sealing vane may engage.

2. The air vent of claim 1 wherein the air grill may be rotated to control the direction of the air flow through the air vent and to close the air vent.

3. The air vent of claim 1 wherein at least one vane has a substantially circular periphery.

4. The air vent of claim 3 wherein the vane with a substantially circular periphery has a radius of at least the radius of the generally spherical envelope.

5. The air vent of claim 1 wherein the compliant surface is substantially in the shape of a ring.

6. The air vent of claim 5 wherein the sealing vane is perpendicular to the second axis.

7. The air vent of claim 1 wherein the first axis is at right angles to the second axis.

8. The air vent of claim 6 wherein the first and second axes pass through the center of the air grill.

9. The air vent of claim 1 wherein the air grill may rotate through at least 180° about the first axis.

10. The air vent of claim 1 wherein the air grill may rotate through at least 60° about the second axis.

11. The air vent of claim 1 wherein at least one of the vanes incorporates a grip feature.

12. An air vent for controlling air flow to the passenger compartment of a motor vehicle comprising:

a housing with a first pivot bearing therein, said housing having a ring-shaped compliant surface with a locating feature for making a seal;

a carrier with a second pivot bearing thereon connected within the housing to the first pivot bearing for rotation about a first axis; and an air grill with a plurality of vanes to control the air flow through the air vent and having a generally spherical envelope, said air grill being connected to the second pivot bearing for rotation about a second axis perpendicular to said first axis so as to control the direction of air flow through the air vent, the air grill being operative to rotate through at least 180° about the first axis, and at least 60° about the second axis; and wherein at least one vane of said plurality is operative to close said air vent by making a seal with the housing compliant surface when said vane is rotated to a predetermined position.

* * * * *